(12) United States Patent
Coleman et al.

(10) Patent No.: US 6,681,954 B2
(45) Date of Patent: Jan. 27, 2004

(54) PRODUCT DISPENSER

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 174 days.

(21) Appl. No.: 09/920,282

(22) Filed: Aug. 2, 2001

(65) Prior Publication Data

US 2003/0024939 A1 Feb. 6, 2003

(51) Int. Cl.[7] ................................................. G07F 11/16
(52) U.S. Cl. .................... 221/254; 221/179; 221/263; 222/305; 222/344; 222/355; 446/475
(58) Field of Search ................................ 221/178, 179, 221/180, 181, 233, 254, 263; 446/475; 222/162, 197, 199, 216, 221, 222, 224, 305, 340, 344, 354, 355, 356

(56) References Cited

U.S. PATENT DOCUMENTS

| | | | | |
|---|---|---|---|---|
| 502,895 A | * | 8/1893 | Van Norman | 221/164 |
| 896,263 A | * | 8/1908 | Aagland | 131/250.1 |
| 958,559 A | * | 5/1910 | Stiles | 221/24 |
| 1,457,050 A | * | 5/1923 | Abbaticchio | 221/254 |
| 1,696,787 A | * | 12/1928 | Zelkowitz et al. | 221/254 |
| 3,311,261 A | * | 3/1967 | Venzke | 221/179 |
| 3,797,166 A | * | 3/1974 | Murray | 446/320 |
| 3,907,286 A | * | 9/1975 | Murrey | 473/24 |
| 5,356,035 A | * | 10/1994 | Shlopak et al. | 222/78 |
| 5,542,570 A | * | 8/1996 | Nottingham et al. | 221/192 |
| 6,062,936 A | * | 5/2000 | Rudell et al. | 446/71 |
| 6,200,186 B1 | * | 3/2001 | Coleman et al. | 446/73 |
| 6,267,639 B1 | * | 7/2001 | Menow et al. | 446/81 |
| 6,425,495 B1 | * | 7/2002 | Senda et al. | 221/24 |

* cited by examiner

Primary Examiner—Patrick Mackey
(74) Attorney, Agent, or Firm—Melvin L. Crane

(57) ABSTRACT

A product dispenser which includes a main housing and a second housing. The main housing contains a pivot arm that closes an electrical switch via a tension spring for producing a desired sound. The pivot arm is operated by a push button which functions to raise a scissor jack which in turn raises a conveyor tube in which a product has been loaded from a product reservoir. The conveyor tube is provided with a slide door that prevents discharge of a product from the reservoir. The conveyor tube also includes a push rod that contacts a pivotable character when the conveyor tube is raised. The push rod pushes the character over so it appears that the character is pouring a product from a container. At the same time the product moves from the conveyor tube to an exit tube. Then the movements are reversed to a rest position from which they started.

12 Claims, 4 Drawing Sheets

PRODUCT DISPENSER

BACKGROUND OF THE INVENTION

This invention is directed to a product dispenser and more particularly it is directed to a product dispenser which controls the dispenser to dispense a product as desired. Further, the dispenser may be made with a sound circuit which is operated upon activation of the dispenser for dispensing pieces of the product.

Heretofore the inventors have patented candy holding devices of different operative systems.

This invention is believed to excite a child or another person during dispensing pieces of a product. The device may be provided with a sound system which is activated by a contact switch such that sounds of a desired nature may be made during operation of the device for dispensing the product. A spring is used to control a slide door which opens and closes an opening through which the product will be dispensed and for lifting the product to an exit tube. During operation of the system the sound could simulate movement of a spring or any other desired sound.

OBJECTS AND ADVANTAGES

An object of the product dispenser is to amuse a person during dispensing pieces of the product.

Another object is to permit a limited number of a product to be dispensed.

Other objects and advantages of the invention will be obvious to those skilled in the art upon reading the specification and viewing the drawings.

DETAILED DESCRIPTION

Figure 1:
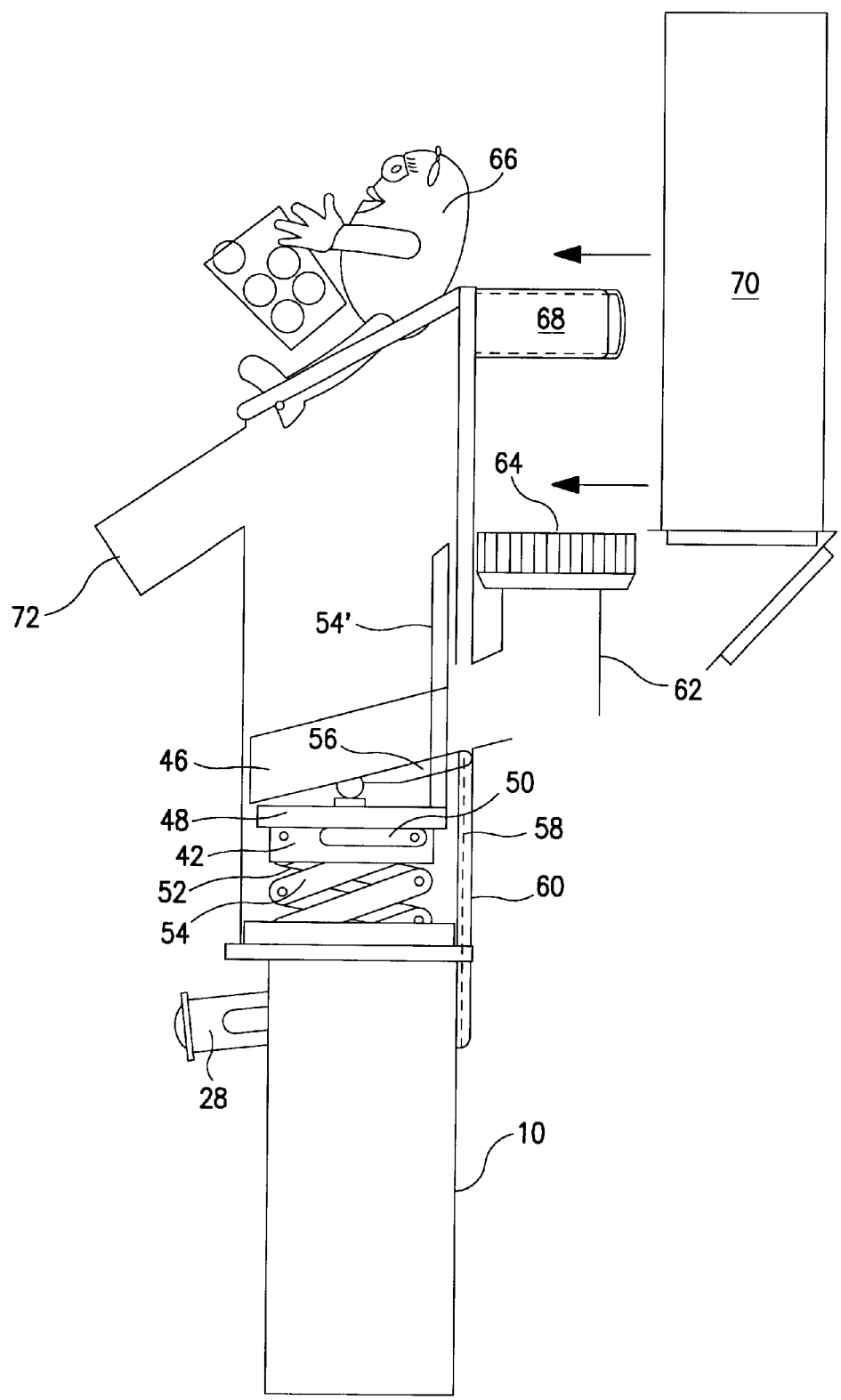
FIG. 1 illustrates a side view of a product dispenser shown in a non-dispensing position and with a removable product holder with a lid.
Figure 2:
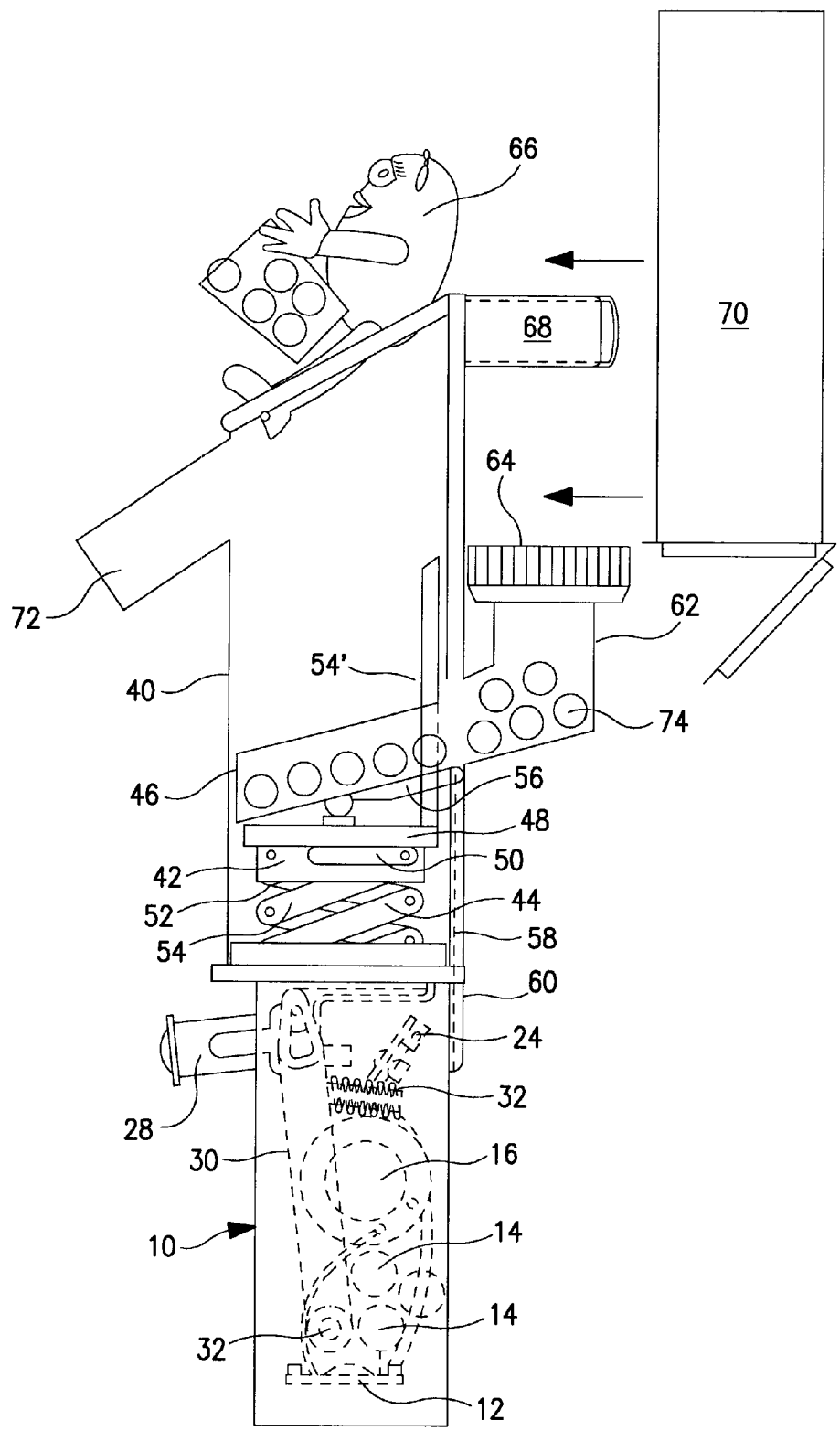
FIG. 2 illustrates the dispenser of FIG. 1 which illustrates a sound system and operative parts shown by dotted lines.
Figure 3:
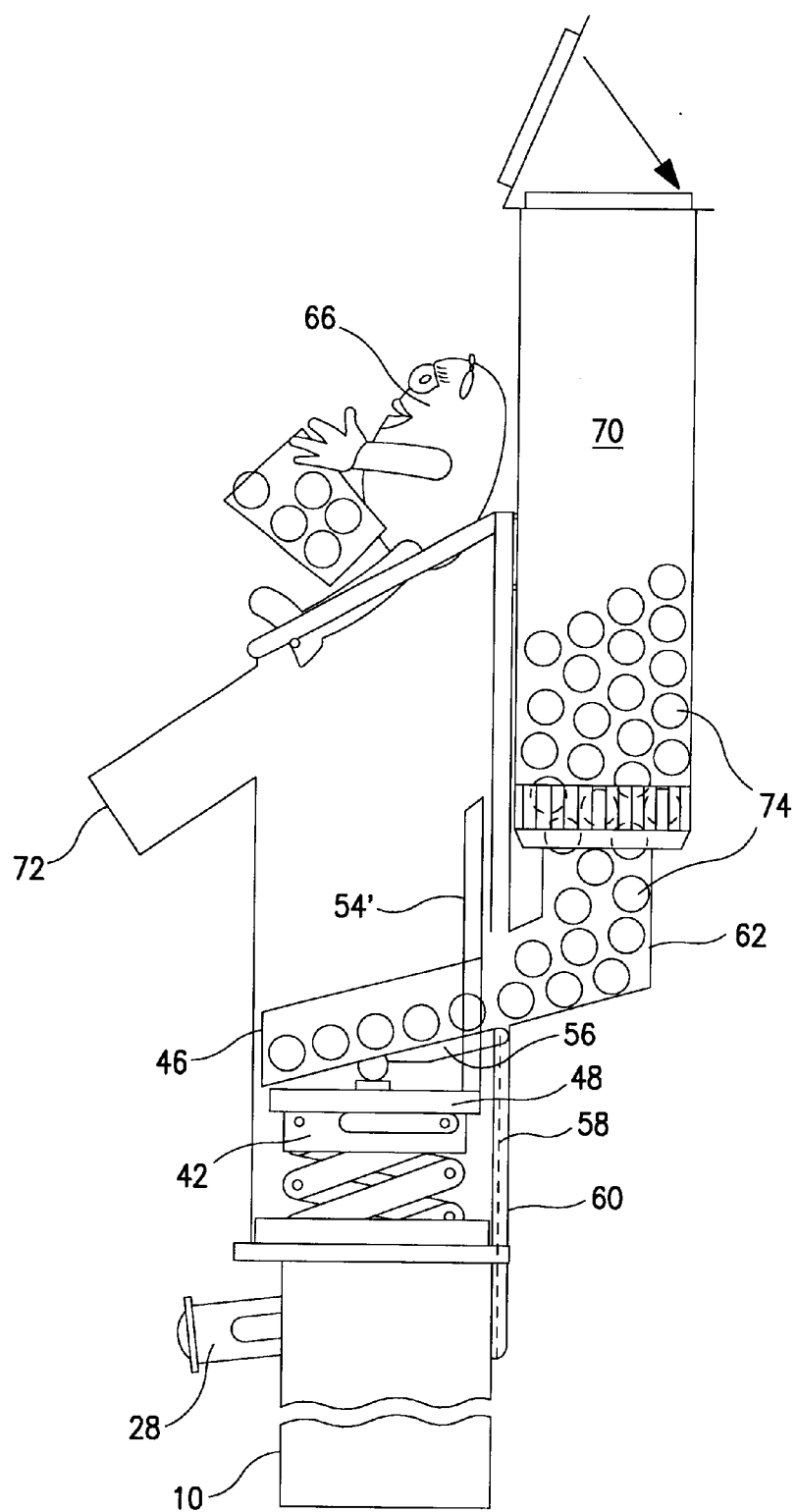
FIG. 3 illustrates a product dispenser which illustrates a reservoir fixed to the dispenser with a lid that closes the reservoir.
Figure 4:
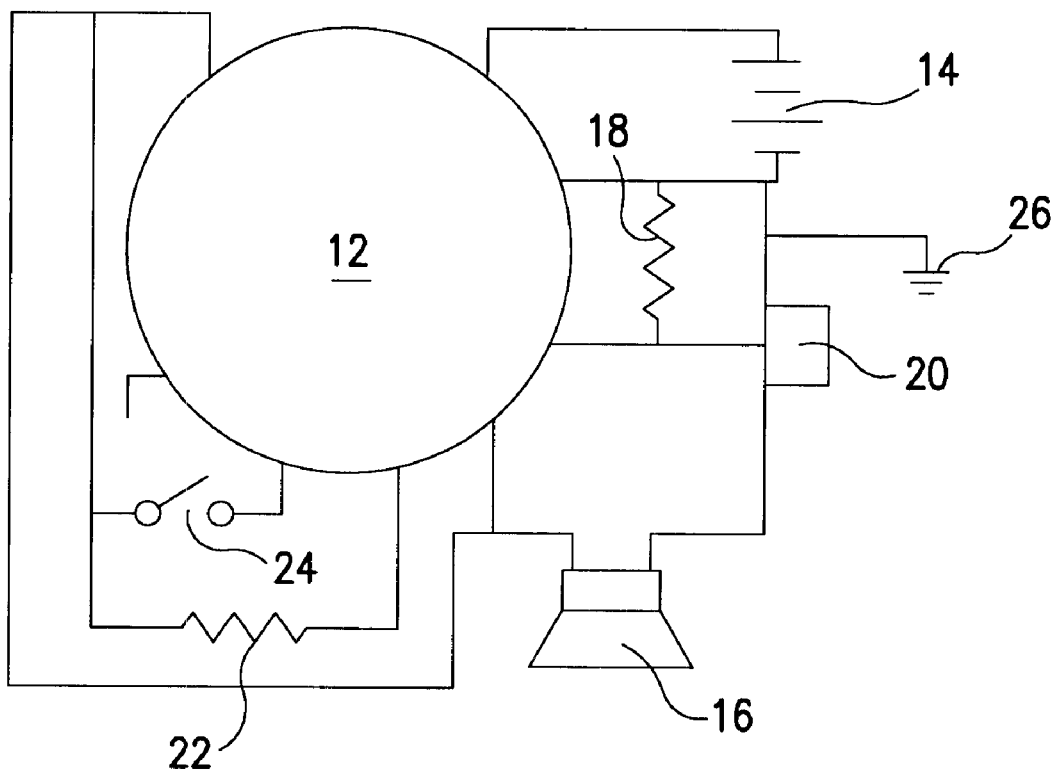
FIG. 4 illustrates the electrical circuitry including a circuit board for producing any desired sound built in the circuit board.

Now referring to the drawings wherein each reference character refers to the same part throughout the drawings, FIG. 1 is a side view of the product dispenser which includes a main housing 10 which includes therein a LM3909 8 pin circuit board 12, a LR44 power supply 14, a 8 ohm 0.25 watt speaker 16, a 570 ohm resistor 18, a T8050 transistor 20, a 1.5 meg ohm resistor 22, a contact switch 24 which activates the circuit, and a ground 26. These are shown in the circuit in FIG. 4. Anyone skilled in the art could substitute different parts for the parts of the circuit as shown. The main housing also includes push button 28 which extends from one side of the main housing. The push button engages a pivot arm 30 which is supported at one end by a pivot pin 32. The pivot arm 30 compresses a tension spring 32 which permits the contact switch 24 to close, thereby completing the electrical circuit which activates the circuit board to produce an operative spring sound or any other sound to which the circuit board has been loaded. The upper end of the pivot arm also engages one end of a linkage of a scissor jack in a lower slide track so that the scissor jack can be operated to raise and lower the scissor jack, which will be explained later.

A secondary housing 40 is secured to an upper end of the main housing. The secondary housing includes therein a scissor-type jack 42 having crossed linkages 44 secured to ends of other crossed linkages in succession of the jack. A stopping conveyor tube 46 is secured to a cross support 48 having an upper slide track 50 which is secured to the ends of upper crossed linkages. One of the ends of an uppermost linkage 52 of the jack is pivotably secured to an end of the cross support 48 in alignment with the upper slide track 50. The upper end of another linkage 54 is slidably secured to the upper slide track so that with the scissor jack as shown, the end of the upper arm 54 is spread apart of the pivot end of the other upper arm 52. A push rod 54' is secured parallel with an elongated axis of the secondary housing which will be explained later on. The support for the candy conveyor tube has an extension arm 56 which extends to one side and connects with a slide door 58. The slide door 58 slides within a slide door housing 60. An angular tube 62 which includes a candy reservoir seat 64 is attached to the secondary housing with the angular tube having an outlet that meets with the inlet of the candy conveyor tube. The secondary housing has an upper end which is closed by a character 66 which appears to be holding a container of imitation candy. The secondary housing is also provided with holding U-clamps 68 which function to hold a product reservoir 70 in place for dispensing a product into the angular tube.

The lower end of the scissor jack has ends of the linkages extending into the main housing. The end of the linkage nearest the push button has a pin (not shown) which extends into the slot of the lower slide track closest to the push button. The end of a pivot arm is secured to the pin so that the end of the linkage rides along the lower slide track as the push button is pushed. The end of the lowest crossed linkage opposite from the other crossed linkage is pivotably secured to the slide track so that the end of the linkage away from the push button has a fixed pivot point about which the end of the linkage pivots.

The product reservoir 70 has been described as a separate piece which can be filled with a product and then secured in place with the outlet end of the reservoir seated in the receptacle seat so that the product 74 can enter the angle tube and the conveyor tube. If desired, a fixed product reservoir can be held in place on the receptacle seat for dispensing the product. The receptacle or reservoir would have a slip top for closing the upper end of the reservoir and which can be opened to refill the reservoir.

In operation, the product reservoir is filled with candy, gum, or any other product to be dispensed from the reservoir by the dispenser. With the scissor jack in the rest position or down position, the product in the reservoir will drop into the angular tube and flow onto the conveyor tube. When one desires to obtain some of the product from the dispenser, the push button is pushed in. As the push button is pushed in, the push button will engage the pivot arm. The pivot arm 30 is moved by the push button to compress the tension spring 32 so that the pivot arm closes the contact switch to activate the circuit board to make a springing sound or any other desired sound from the integrated circuit. As the pivot arm is moved by the push button, the end of the pivot arm moves the end of the linkage of the scissor jack pin in the lower slide tract. Since the end of the other lowest linkage of the scissor jack is pivotably fixed to the lower slide track, the scissor jack will be raised by the crossed linkages. As the scissor jack raises, the conveyor tube is also raised. As the conveyor tube support is raised, the slide door crosses the end of the angular tube to prevent any product from being released from the reservoir. The conveyor tube is raised to a height so that the conveyor tube is in alignment with the exit tube. When the conveyor has been raised almost to its uppermost level with the exit tube, the push rod contacts the underside of the character which tilts the character to appear like candy is being dropped from the imitation candy holder. Once the product has been dispensed via the exit tube, the push button is released and the pivot arm is moved to the left toward the push button by the tension spring. As the pivot arm is moved toward the push button, the scissor jack linkages are lowered which lowers the conveyor tube. As the conveyor tube is moved downwardly by the scissor jack, the character falls back into a rest position, the slide door is moved downwardly and when the slide door is down the conveyor tube is in the rest position, the product is released from the angular tube to fill the conveyor tube. The dispenser is now ready for obtaining more of the product by operation of the push button.

Since the sound circuit is a separate complete system from that of the product dispenser, the sound circuit could be dispensed with which would make a muchless expensive dispenser.

The dispenser can be used for dispensing candy, gum or any other product that will pass through the angular tube, the conveyor tube, and the exit tube. One would not expect to dispense a liquid; however, a delectable liquid could be contained in a paraffin wax ball or any other substance for dispensing.

It would be obvious to one skilled in the art to make the accessible parts without any sharp corners or appendages whereby a child could be injured.

The foregoing relates to preferred exemplary embodiments of the invention, it being understood that other variants and embodiments thereof are possible within the spirit and scope of the invention, the latter being defined by the appended claims.

We claim:

1. A product dispenser which comprises a main housing, and a secondary housing secured onto said main housing, a separate product holder, means for dispensing a product from the separate product holder onto a conveyor tube, a product exit tube, means for raising said conveyor tube to a level with the product exit tube, control means for activating movement of the conveyor tube for dispensing the product, ad means for preventing a flow of the product from the separate product reservoir as the conveyor tube is raised, and a character in combination with a container for an imitation product, and a push rod secured to said conveyor tube which activates movement of the character.

2. A product dispenser as set forth in claim 1, in which the means for raising the conveyor tube to a level of an exit tube is a scissor jack.

3. A product dispenser as set forth in claim 2, in which the means for activating the movement of the conveyor tube is a push button which activates a pivot arm that operates linkages of the scissor jack.

4. A product dispenser according to claim 1, in which the means for preventing a flow of the product from the product reservoir is a movable slide door.

5. A product dispenser according to claim 2, in which the means for preventing a flow of the product from the product reservoir is a movable slide door.

6. A product dispenser according to claim 3, in which the means for preventing a flow of the product from the product reservoir is a movable slide door.

7. A product dispenser as set forth in claim 1, which includes an electrical sound circuit, a switch for activating the sound circuit, and said push rod activates the switch for activating the sound circuit.

8. A product dispenser as set forth in claim 2, which includes an electrical sound circuit, a switch for activating the sound circuit, and said push rod activates the switch for activating the sound circuit.

9. A product dispenser as set forth in claim 3, which includes an electrical sound circuit, a switch for activating the sound circuit, and said push rod activates the switch for activating the sound circuit.

10. A product dispenser as set forth in claim 4, which includes an electrical sound circuit, a switch for activating the sound circuit, and a push rod which activates the switch for activating the sound circuit.

11. A product dispenser as set forth in claiming 5, which includes an electrical sound circuit, a switch for activating the sound circuit, and said push rod activates the switch for activating the sound circuit.

12. A product dispenser as set forth in claim 6, which includes an electrical sound circuit, a switch for activating the sound circuit, and said push rod activates the switch for activating the sound circuit.

\* \* \* \* \*